(12) United States Patent
Przykucki et al.

(10) Patent No.: US 8,266,433 B1
(45) Date of Patent: Sep. 11, 2012

(54) METHOD AND SYSTEM FOR AUTOMATICALLY MIGRATING ENCRYPTION KEYS BETWEEN KEY MANAGERS IN A NETWORK STORAGE SYSTEM

(75) Inventors: Robert Przykucki, Redwood City, CA (US); Gaurav Agarwal, Menlo Park, CA (US); Leo Janze, Alamo, CA (US); Logan Rand Jennings, Menlo Park, CA (US); Robert Bartozynski, San Mateo, CA (US)

(73) Assignee: NetApp, Inc., Sunnyvale, CA (US)

( * ) Notice: Subject to any disclaimer, the term of this patent is extended or adjusted under 35 U.S.C. 154(b) by 660 days.

(21) Appl. No.: 12/433,864

(22) Filed: Apr. 30, 2009

(51) Int. Cl.
*H04L 29/06* (2006.01)

(52) U.S. Cl. ..................... 713/168; 380/286

(58) Field of Classification Search .............. 713/168
See application file for complete search history.

(56) References Cited

U.S. PATENT DOCUMENTS

| | | | | |
|---|---|---|---|---|
| 5,621,795 A * | 4/1997 | Baker et al. | ............... | 380/277 |
| 5,907,618 A * | 5/1999 | Gennaro et al. | ............... | 380/286 |
| 6,058,188 A * | 5/2000 | Chandersekaran et al. | .. | 380/286 |
| 6,185,308 B1 * | 2/2001 | Ando et al. | ............... | 380/286 |
| 6,266,421 B1 * | 7/2001 | Domyo et al. | ............... | 380/286 |
| 6,335,972 B1 * | 1/2002 | Chandersekaran et al. | .. | 380/286 |
| 6,633,978 B1 * | 10/2003 | Angelo et al. | ............... | 713/100 |
| 7,970,143 B2 * | 6/2011 | Vennelakanti et al. | ....... | 380/277 |
| 2005/0135626 A1 * | 6/2005 | Ball et al. | ............... | 380/277 |
| 2006/0190766 A1 * | 8/2006 | Adler et al. | ............... | 714/13 |
| 2008/0209221 A1 * | 8/2008 | Vennelakanti et al. | ....... | 713/183 |
| 2008/0232598 A1 * | 9/2008 | Vennelakanti et al. | ....... | 380/279 |
| 2009/0089582 A1 * | 4/2009 | Brutch et al. | ............... | 713/171 |
| 2009/0323963 A1 * | 12/2009 | McTeer et al. | ............... | 380/277 |
| 2010/0202617 A1 * | 8/2010 | Balakrishnan et al. | ....... | 380/277 |

OTHER PUBLICATIONS

Voltage Security, Inc. "What is key management? encryption is easy; key management is hard." Downloaded http://www.voltage.com/technology/key-management (Apr. 28, 2009).
Neoscale.com "CryptoStor® Key Vault™ -Enterprise-class key management" www.neoscale.com, Milpitas, CA (copyright 2002-2007).
"nCipher keyAuthority".www.ncipher.com, Milpitas, CA. Copyright 2008.
"RSA key manager with application encryption". Downloaded http://www.rsa.com/node.aspx?id=3013 (Apr. 28, 2009).
SafeNet. "File encryption with SafeNet ProtectFile". Downloaded http://www.safenet-inc.com/products (Apr. 28, 2009).
Sun Microsystems. "Sun storage tek crypto key management system." Downloaded http://www.sun.com/storagetek (Apr. 28, 2009).

* cited by examiner

*Primary Examiner* — Oscar Louie
(74) *Attorney, Agent, or Firm* — Perkins Coie LLP

(57) ABSTRACT

Embodiments of the present invention provide a method and system, in a network storage system, for a remote key manager performing cryptographic operations upon a failure of a protected key manager, using a hardware encryption key (key) automatically migrated from the protected key manager. During initialization, the protected and remote key managers authenticate the communication channel (e.g. trustee link) between each other. A new key generated by dedicated hardware of the protected key manager is used by the protected key manager to perform cryptographic operations on data of a storage server. The remote key manager then requests and obtains the new key from the protected key manager across the trustee link. Upon a failure of the protected key manager, the remote key manager performs cryptographic operations on data of the storage server using the migrated key, ensuring accessibility and security of such data.

23 Claims, 11 Drawing Sheets

METHOD AND SYSTEM FOR AUTOMATICALLY MIGRATING ENCRYPTION KEYS BETWEEN KEY MANAGERS IN A NETWORK STORAGE SYSTEM

FIELD OF THE INVENTION

The present invention pertains to data storage servers, and more particularly, to a remote key manager performing cryptographic operations upon a failure of a protected key manager, using a hardware encryption key automatically migrated from the protected key manager.

BACKGROUND

A storage server is a computer that provides storage services relating to the organization of information on mass storage devices, such as flash memories, tapes or disks. The storage server is commonly deployed within a storage area network (SAN) or a network attached storage (NAS) environment. When used within a NAS environment, the storage server may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The file server may be further configured to operate according to a client/server model of information delivery to thereby allow many client systems (clients) to access shared resources, such as files, stored on the file server. Storage of information on a NAS system is typically deployed over a computer network comprising a geographically distributed collection of interconnected communication links, such as Ethernet, that allow clients to remotely access the information (files) on the file server. The clients typically communicate with the file server by exchanging discrete frames or packets of data according to pre-defined protocols, such as the Transmission Control Protocol/Internet Protocol (TCP/IP).

In the client/server model, the client may comprise an application executing on a computer that "connects" to the storage server over a computer network, such as a point-to-point link, shared local area network, wide area network or virtual private network implemented over a public network, such as the Internet. NAS systems generally utilize file-based access protocols; therefore, each client may request the services of the storage server by issuing file system protocol messages (in the form of packets) to the file system over the network identifying one or more files to be accessed without regard to specific locations, e.g., blocks, in which the data are stored on disk.

A network environment may further be configured wherein information (data) is encrypted in storage served by one or more storage servers using one or more security devices. Each security device is configured to transform unencrypted data (cleartext) supplied by clients into encrypted data (ciphertext) destined for storage by the storage server. Storage having encrypted data may thus be referred to as "secure storage" since data is not stored in its native form but rather in encrypted form.

Secure storage may be logically divided into one or more portions with which each is associated with its own encryption key for performing cryptographic operations (i.e. encrypt and decrypt). An encryption key (key and encryption key are used interchangeable herein) is a code or number which, when taken together with an encryption algorithm, defines a unique transformation used to encrypt or decrypt data. Data remains encrypted while stored in secure storage until requested by an authorized client. Upon such a request, the security device uses the appropriate key for performing the requested cryptographic operations. For instance, data may be encrypted prior to storage by the storage server or decrypted prior to supplying data to the requesting client.

In many practical security systems there exist several portions of secure storage managed by the storage server. A key manager such as the Lifetime Key Management™ Appliance developed by NetApp, Inc. of Sunnyvale, Calif., may thus be operative with the storage server and security devices for managing the keys used thereby. Management of keys includes maintaining permissions, governing key access, providing key backup, carrying out key archival procedures, performing client management procedures, monitoring security devices, updating keys, performing disaster recovery, and other management functions. When an authorized client requests data from a particular portion of secure storage, the key manager retrieves the proper key and supplies it to the security device for performing the required cryptographic operation.

A primary concern with the central management of keys involves ensuring the continued accessibility of data in secure storage when the key manager fails. A second key manager (remote key manager) may therefore be available to manage a copy (mirror) of the keys. The remote key manager is operative with a remote security device and a remote storage server storing a mirror of the primary storage server data for performing cryptographic operations on the mirrored data upon a failure of the primary key manager.

To facilitate the handling of keys between key managers, security devices, and storage servers, such keys are conventionally operative in software-based encryption systems on each device. Software-based systems typically use keys of shorter lengths for use in computations to convert ciphertext to plaintext which may be easily implemented by a variety of devices without requiring specialized hardware. However, a key having a shorter length is referred to as a "weak key" since the key may be subject to unauthorized access by virtue of its shared processing resources with other software and/or the relative ease in which a key may be "guessed" by an unauthorized user.

In contrast, hardware-based encryption systems use dedicated hardware and keys of longer lengths (referred to as "strong keys") for providing a greater level of protection against unauthorized access. To that end, the greater level of protection results in more complexity and difficulty in sharing keys among several devices. One conventional approach for sharing hardware keys and avoiding such complexities involves a security administrator manually supplying keys between devices. Such manual efforts are impractical and inefficient, however, due to the volume of keys generated for various portions of secure storage.

An alternative approach for ensuring the availability of keys involves storing a copy of the keys in a less secure location (i.e. external storage) such as a location of the storage server. If the key manager fails, the storage server may provide the appropriate key for performing the desired cryptographic operations on data of the storage server. However, while the manual efforts required by the prior technique are alleviated in the alternative approach, the keys under the latter approach are instead exposed to potential unauthorized access by other system applications and/or programs operative within the storage server. Accordingly, a tradeoff exists between the ease of key handling in a storage system configured for disaster recovery and protecting a key from unauthorized access.

SUMMARY

Embodiments of the present invention provide a method and system, in a network storage system, for a remote key manager performing cryptographic operations upon a failure of a protected key manager, using a hardware encryption key (key) automatically migrated from the protected key manager. During initialization, the protected and remote key managers authenticate the communication channel (e.g. trustee link) between each other. A new key generated by dedicated hardware of the protected key manager is used by the protected key manager to perform cryptographic operations on data of a storage server. The remote key manager then requests and obtains the new key from the protected key manager across the trustee link. Upon a failure of the protected key manager, the remote key manager performs cryptographic operations on data of the storage server using the migrated key, ensuring accessibility and security of such data.

Under normal operating conditions, the protected key manager services cryptographic requests from the protected storage server which is mirrored to a remote storage server. The remote storage server is similarly connected to a remote key manager which services cryptographic requests from the remote storage server. The remote key manager is further operative to automatically request and obtain new keys from the protected key manager via the trustee link. In a disaster, data storage requests intended for the protected storage server are performed at the remote storage server using mirrored data, whereby the remote key manager performs cryptographic operations using the migrated key upon the storage or retrieval of the mirrored data.

In accordance with the novel techniques described herein, a key is both managed and used by key managers to avoid the need for separate security devices having specialized hardware for handling the key. Since key handling is performed exclusively by key managers which have been authenticated via the trustee link, a key may be protected against unauthorized access at both the protected and remote key managers for ensuring the integrity of the key. Other aspects of the invention are apparent with the following detailed description taken in conjunction with the accompanying drawings, which illustrate the principles of the invention by way of example.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

A method and system, in a network storage server, for a remote key manager performing cryptographic operations upon a failure of protected key manager, using a hardware encryption key automatically migrated from the protected key manager is provided herein. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

Storage System Environment

Figure 1:
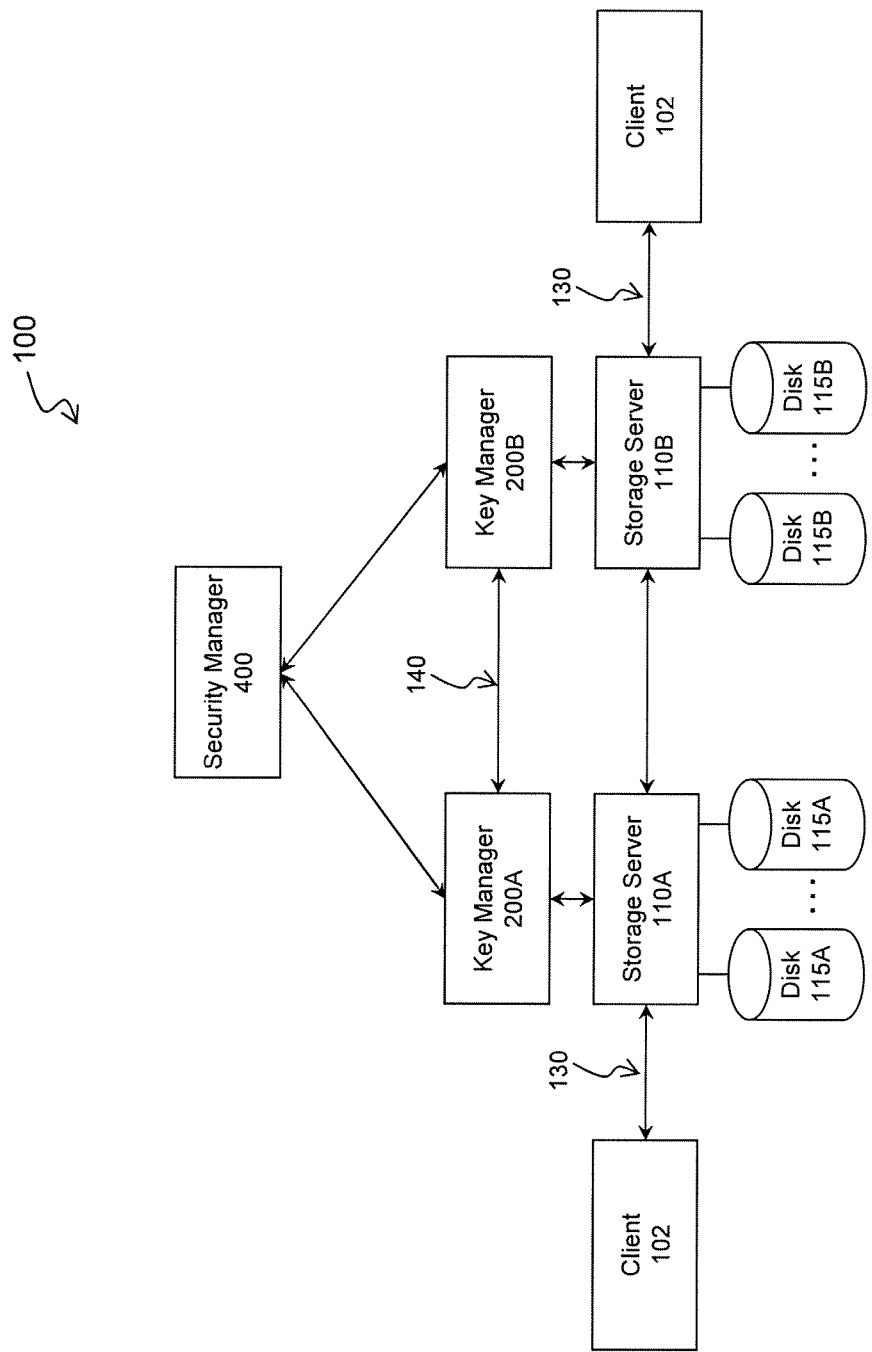
FIG. 1 is a schematic block diagram of a network storage system environment including key managers that may be advantageously used with the present invention.

FIG. 1 is a schematic block diagram of a network storage system environment 100 including key managers 200 that may be advantageously used with the present invention. In one embodiment, key managers 200 perform cryptographic operations on data as requested by respective storage servers 110 of environment 100. Key managers 200 further manage encryption keys for maintaining permissions, governing key access, providing key backup, carrying out key archival procedures, performing client management procedures, updating keys, and performing disaster recovery and other key manager functions.

Illustratively, each of the key managers 200 employs a conventional encryption algorithm, e.g., the Advanced Encryption Standard (AES) or other appropriate algorithms, to transform unencrypted data (cleartext) into encrypted data (ciphertext) intended for storage by storage servers 110. To that end, key managers 200 illustratively use a high-quality, pseudo random number generation technique to generate encryption keys. The encryption and decryption operations are performed using the keys associated with the portions of secure storage on disk. Key managers 200 use the appropriate key to encrypt or decrypt the respective portions of data. In addition to performing encryption and decryption operations, key managers 200 may also perform other operations such as access control, authentication, virtualization, and secure-logging operations in certain embodiments.

As shown in environment 100, key managers 200 are coupled to respective one or more storage servers 110 via an interconnect which may be, for example, a computer network, such as a point-to-point link, shared local area network, wide area network or virtual private network implemented over a public network, such as the Internet. As configured herein, key manager 200A connects to storage server 110A, whereas key manager 200B connects to storage server 110B. Key managers 200 are further operative to act as a cryptographic module, servicing cryptographic requests from respective storage servers 110 to encrypt data intended for storage or to decrypt data retrieved from storage of storage servers 110. Requests from storage servers 110 further include a secure storage ID to indicate the particular portion on disk the data has been or will be stored. Key managers 200 then use the secure storage ID to retrieve the appropriate key for performing the requested operation, and to return processed (i.e. encrypted or decrypted) data to storage server 110.

Each storage server 110 is embodied as a system comprising a processor, a memory, one or more network adapters, a storage adapter, and mass storage devices such as flash memories, tapes or disks (these components are not shown in FIG. 1). Data storage services are provided by storage servers 110 to one or more clients 102 through a network 130. Network 130 may be, for example, a local area network (LAN), wide area network (WAN), metropolitan area network (MAN), global area network such as the Internet, a Fibre Channel fabric, or any combination of such interconnects. Each of clients 102 may be, for example, a conventional personal computer (PC), server-class computer, workstation, handheld computing or communication device, or other special or general purpose computer.

Storage of data on mass storage devices (e.g. disks 115) is managed by storage servers 110, which receive and respond to various read and write requests from clients 102, directed to data stored in or to be stored in disks 115. Mass storage devices can include, for example, flash memory, magnetic or optical disks, or tape drives. The disks 115 can further be organized into arrays (not shown in this figure) implementing a Redundant Array of Inexpensive Disks/Devices (RAID) scheme, whereby storage servers 110 access disks 115 using one or more RAID protocols known in the art for recovering from a failure of one or more disks 115.

Storage servers 110 may also provide file-level service such as used in a network-attached storage (NAS) environment, block-level service such as used in a storage area network (SAN) environment, or a service which is capable of providing both file-level and block-level service. Although each of the storage servers 110 is illustrated as single unit in FIG. 1, a storage server can, in other embodiments, be comprised of a physically separate network layer or module (an "N-Module") and disk layer or module (a "D-Module") in accordance with a distributed storage server environment. In one embodiment, the D-Module includes data processing and storage access components. In contrast, the N-Module includes functionality that enables client access to storage access components (e.g. the D-Module) and includes protocol components, such as Common Internet File System (CIFS), Network File System (NFS), or an Internet Protocol (IP) module, for facilitating such connectivity. An exemplary distributed storage server architecture is generally described in U.S. Pat. No. 6,671,773, entitled METHOD AND SYSTEM FOR RESPONDING TO FILE SYSTEM REQUESTS, by M. Kazar et al. issued Dec. 30, 2003.

In certain embodiments, storage server 110 is referred to as a network storage subsystem. A network storage subsystem provides networked storage services for a specific application or purpose. Examples of such applications include database applications, web applications, Enterprise Resource Planning (ERP) applications, etc., e.g., implemented in a client. Examples of such purposes include file archiving, backup, mirroring, etc., provided, for example, on archive, backup, or secondary storage servers connected to a primary storage server. A network storage subsystem can also be implemented with a collection of networked resources provided across multiple storage servers. In the exemplary embodiment, each of the storage servers 110 is embodied as a database server for servicing database requests from clients 102. For example, the storage servers 110 each execute a database application (not shown) implementing, e.g., a conventional a Structured Query Language (SQL) compliant database, to communicate with clients 102 as a database server. As configured in such a distributed environment, key managers 200 may be coupled to respective D-Modules for performing cryptographic operations on data managed thereby.

To facilitate a disaster recovery event, a pair of key managers 200A, 200B may be configured to ensure key availability for the life of the data securely stored by a database server. In other embodiments, more than two key managers 200 may be configured to ensure key availability. Key managers 200 are located at remote locations from each other to protect against a site-wide disaster impacting one of the key managers. Illustratively, key managers 200 are connected via a computer network 140, such as a point-to-point link, shared local area network, wide area network or virtual private network implemented over a public network, such as the Internet, for example. Network 140 in the exemplary embodiment operative between the key managers may further be authenticated by verifying the identity of the key managers participating at both ends. The communication pathway between key managers 200 implemented by authenticated network 140, for example, is referred to as a "trustee link" by which keys may be safely sent from one key manager to another key manager located remotely.

Under conventional techniques, keys are manually supplied by a security administrator to a remote key manager or stored in a less secure location, e.g. storage server 110, to ensure availability of such keys even in a disaster. However, one shortcoming of the conventional approach is the inefficiency associated with a manual migration process. Alternatively, using the resources of the storage servers 110 to maintain a copy of the keys and to perform cryptographic operations may compromise the integrity of secure storage if the keys are accessed in an unauthorized manner by other system program and/or applications sharing the physical resources of the storage server and used to perform cryptographic operations on encrypted data.

Figure 3:
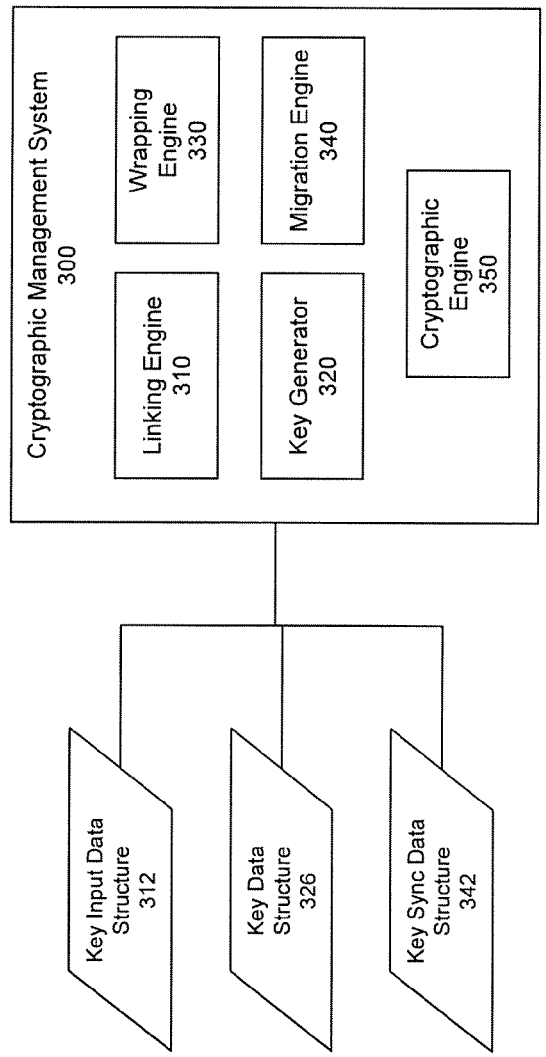
FIG. 3 is an exemplary cryptographic management system operative in a key manager of FIG. 2 for securely migrating keys between key managers.

To overcome the shortcomings of the conventional approach, each of key managers 200 implements a novel cryptographic management system, discussed further in reference to FIG. 3, for enabling a primary (or protected) key manager, e.g. key manager 200A, to securely migrate keys to a secondary (or remote) key manager, e.g. key manager 200B, and for enabling the remote key manager to use the migrated key to perform cryptographic operations on data of storage servers 110 upon a failure of the protected key manager. Under normal operation, storage server 110A is a primary provider of storage services for client 102, whereas storage server 110B is a secondary provider of storage services for client 102 and mirrors the data of storage server 110A. In one embodiment, each of the storage servers 110 implements functionality for copying or mirroring data between storage servers known in the art. Further, key manager 200A is operative to perform cryptographic operations for storage server 110A, and key manager 200B is operative to perform operations for storage server 110B upon a failover event.

Using the cryptographic management system, key manager 200A may automatically provide keys across network 140 to key manager 200B. Upon a failure of key manager 200A and the resultant inaccessibility to encrypted data of storage server 110A, client 102 requests are directed to storage server 110B, which may service storage requests using key manager 300B and the keys managed thereby. In this way, key managers 200A, 200B cooperate to provide continued access to data stored securely on disks 115.

It should be noted that the description of environment 100 comprising encryption/decryption functionality in the key managers 200 should be taken as exemplary only. The principles of the present invention may also be utilized in other environments where such functionality is partially or fully embedded into other systems within environment 100. For example, encryption functionality such as encryption key generation may be performed by clients 102 and/or storage servers 110, in addition to security functionality provided by disks 115. As such, the description of discrete key managers 200 performing the described cryptographic operations should be taken as exemplary only.

Key Manager

Figure 2:
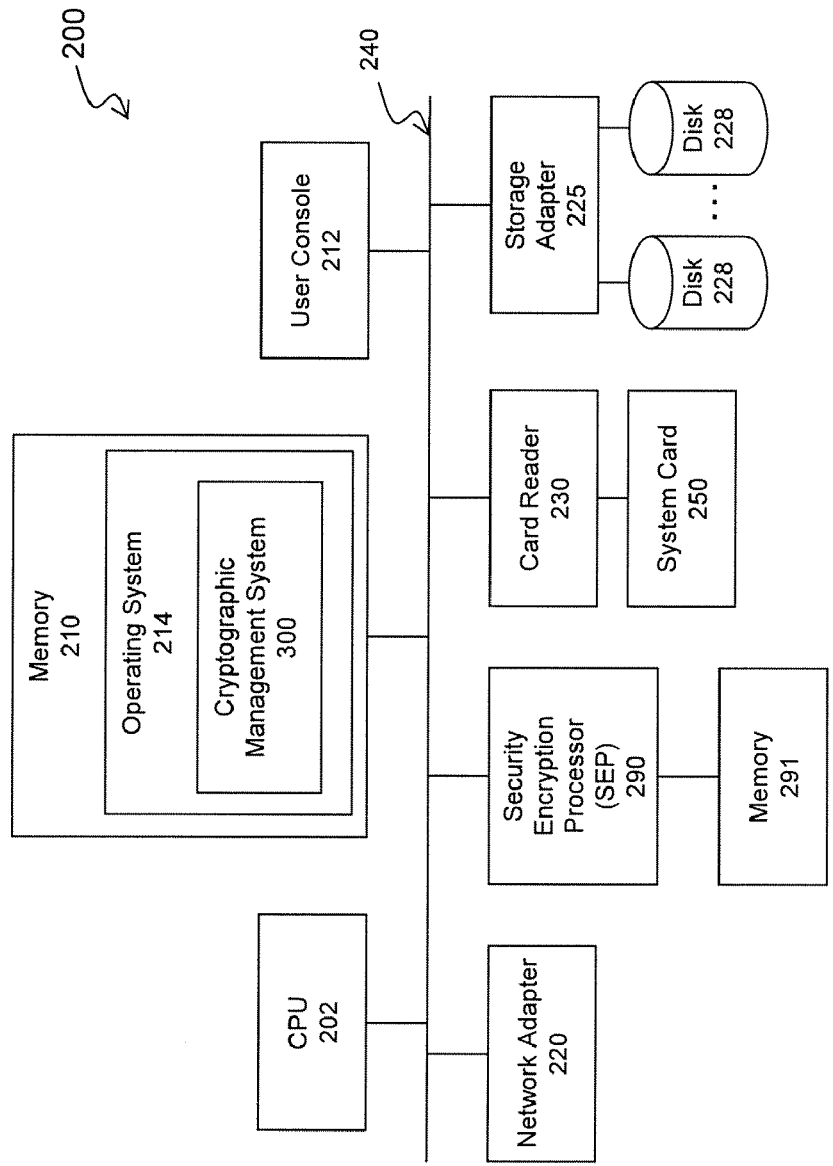
FIG. 2 is a schematic block diagram of a key manager from FIG. 1 that may be advantageously used with the present invention in one embodiment.

FIG. 2 is a schematic block diagram of a key manager (e.g. key manager 200A, 200B from FIG. 1) that may be advantageously used with the present invention. The key manager comprises one or more processors, e.g., central processing units (CPU) 202, a memory 210, one or more network adapters 220, a security encryption processor (SEP) 290 and a card reader 230 interconnected by a system bus 240, such as a conventional Peripheral Component Interconnect (PCI) bus.

To secure data managed by the key manager, SEP 290 is preferably operative as a hardware-based encryption system to perform cryptographic operations using keys stored in a storage location accessed by SEP 290. Storage locations accessed by SEP 290 may include a non-volatile memory 291, such as flash memory, coupled only to SEP 290 and thereby isolated from the "reach" of CPU 202. Alternatively, SEP 290 may access storage locations on other storage devices (e.g. disks 228) which may be commonly accessed by CPU 202. Illustratively, the key manager invokes the functionality of SEP 290 for generating keys and performing cryptographic operations (i.e. encryption, decryption) on data supplied to SEP 290. In one embodiment, SEP 290 is embodied as a Federal Information Processing Standards (FIPS) certified module that is mounted onto a dedicated interface card or other similar card.

In operation, SEP 290 generates keys (i.e. hardware keys) and performs cryptographic operations for the key manager independent of operations performed by CPU 202. That is, software executing on CPU 202 (stored in memory 210, for example) may not execute on SEP 290 and vice versa. Keys stored in memory 291 may be stored in its native form (e.g. plain text format). In contrast, when stored in storage locations commonly shared by CPU 202 such as on disks 228, keys are encrypted using another key, for example, stored in memory 291 to prevent unauthorized access by software executing on CPU 202. A hardware-based encryption system in this fashion prevents unauthorized access to keys by other system software operative in the key manager.

To validate an authorized user of the key manager, card reader 230 provides an exclusive interface between a storage device (e.g. system card 250), which stores "tokens" or passwords of the authorized user, and SEP 290. In the exemplary embodiment, the storage device is embodied in system card 250 which constitutes solid-state memory such as flash memory, although system card 250 may optionally include non-solid state memory in other embodiments. When initializing the key manager, the security administrator couples system card 250 to card reader 230 to thereby authorize SEP 290 to perform cryptographic operations.

Memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 214, portions of which are typically resident in memory and executed by the processing elements, functionally organizes the key manager by invoking operations in support of software processes and/or modules implemented by the device. It would be apparent to those skilled in the art that other processing and memory means, including various computer readable media, may be used for storing and executing program instructions pertaining to the invention described herein.

As used herein, the term "operating system" generally refers to the computer-executable code operable on a computer for performing the functions of the key manager and may, in the case of key managers 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for key management applications as described herein.

Illustratively, the key manager includes one or more storage adapters 225 for storing keys managed by the key manager on storage devices such as disks 228. The storage devices may include flash memories, tapes or other non-volatile memory in other embodiments. When a key is received or generated by the key manager, such keys may be stored on disks 228. When performing cryptographic operations requested by a requesting database server, the key manager retrieves the appropriate key from disks 228 and SEP 290 performs the requested cryptographic operation on data also supplied in the request. It will be appreciated that in other embodiments, the key manager may utilize external storage of keys in a storage system (not shown), for example. There, the key manager may issue requests to read keys and retrieve keys from storage managed by the storage system. As such, the invention is not so limited to the embodiment of internal storage described herein.

Network adapter 220 in FIG. 2 connects the key manager to one or more clients 102, storage servers 110, and/or remote key managers 200, e.g. over point-to-point links, wide area networks, virtual private networks implemented over a public network (Internet) or shared local area networks. In a NAS environment configured to support, e.g., the conventional Common Internet File System (CIFS) and the Network File System (NFS) data access protocols, network adapters 220 may comprise network interface cards (NICs) having the mechanical, electrical and signaling circuitry needed to connect the appliance to, e.g., an Ethernet network.

To protect against a disaster with the (protected) key manager, a cryptographic management system (CMS) 300 is resident in memory 210 for automatically migrating keys from the key manager to a remote key manager and initiating cryptographic operations using the migrated keys. CMS 300 is operative to first establish a trustee link between key managers 200 described further in reference to FIG. 6. A security administrator may interface with the key manager via a user console 212 such as a keyboard and monitor (not shown in FIG. 2) to provide information required to establish the trustee link. Such information includes the name of the key manager to which the keys will be mirrored.

Upon establishment of the trustee link, CMS 300 accesses keys stored on disks 228 and securely migrates such keys to a remote key manager over the trustee link. When the protected key manager fails, the remote key manager thereafter uses the migrated key to perform cryptographic operations on mirrored data of the database server, for example. Illustratively, each key manager 200A, 200B (from FIG. 1) implements aspects of CMS 300 for ensuring the accessibility of encrypted data stored in secure storage (e.g. disks 115A, 115B). To that end, key manager 200A is operative to retrieve keys and perform cryptographic operations under normal operation, whereas key manager 200B is operative to automatically perform such functions in a disaster recovery event.

Cryptographic Management System

FIG. 3 is an exemplary cryptographic management system (CMS) 300 operative in key managers 200 of FIG. 1 for automatically migrating keys from a protected key manager (e.g. key manager 200A) to a remote key manager (e.g. key manager 200B) to ensure accessibility of encrypted data. Illustratively, the CMS includes a linking engine 310, a key generator 320, a wrapping engine 330, a migration engine 340, and a cryptographic engine 350, each resident as instructions stored in memory 210 and executed by CPU 202. It will be appreciated that aspects of the CMS may be optionally implemented in firmware or hardware, or any combination thereof. Further, aspects of the CMS may be executed in the same or different processing environment so it will be appreciated that the invention is not so limited to the embodiments discussed herein.

Linking engine 310 includes operations for establishing an authenticated communication channel (e.g. trustee link) between the protected key manager and a remote key manager. It will be appreciated that linking engine 310 may establish a trustee link using, e.g., a shared secret, a certificate to establish a secure communications channel, or using other mechanisms for verifying the identity of the key manager as known in the art. In one embodiment, linking engine 310 is operative with security manager 400, for example, for establishing the trustee link to ensure that data is delivered to the intended key manager. An exemplary technique for the linking process is described further in reference to FIG. 6.

In one embodiment, when establishing a trustee link, linking engine 310 facilitates the replication of a hardware key generated by the hardware-based encryption system (HES) of the protected key manager (e.g. SEP 290 from FIG. 2) and stored in memory 291, at the remote key manager to thereby advantageously provide hardware-level encryption across the trustee link. This hardware key is referred to as a "link key" which is used in a dedicated manner by the HES of the protected key manager to encrypt data prior to sending such data to the remote key manager. To access the encrypted data upon receipt, the remote key manager must also have access to the link key (or a copy thereof) to decrypt the data encrypted by the protected key manager. However, since the hardware key cannot be provided over network 140 in plain text, for example, linking engine 310 facilitates the replication of the link key in the remote key manager.

Illustratively, linking engine 310 retrieves key inputs used by each of the key managers in generating a link key. For example, such inputs may be stored in local memory 210 (FIG. 2) of each key manager as a key input data structure 312. The key inputs may include a public key known in the art to establish secret communication channels between systems without requiring an initial exchange of secret keys, as well as the name of the hash algorithm used by the HES of the protected key manager. The hash algorithm name is used to access a hash algorithm program or logic resident in SEP 290 to be used to process the key inputs. Linking engine 310 may then provide key input data structure 312 to security manager 400, which is forwarded to the other key manager. Upon receipt, a linking engine 310' of the recipient key manager is operative to receive the key input information and store the contents thereof in a key input data structure 312' of the recipient key manager.

In one embodiment, linking engine 310 is operative in the protected key manager to supply a first key input (key input A) to the remote key manager via the security manager for generating a link key (link key B) at the remote key manager. Linking engine 310' at the remote key manager is similarly operative to supply a key input (key input B) to the protected key manager via the security manager for generating a link key (link key A) at the protected key manager. The exchange of key inputs thereby enables the key managers to generate link keys that are operative to perform cryptographic operations on data encrypted or decrypted by the other in accordance with the novel techniques described herein.

To generate a key using the supplied key inputs, a key generator operative in each of the key managers sends a request to the respective HES of each of the key managers to replicate the hardware key. In the protected key manager, a key generator 320 accesses key input data structure 312 and supplies the key input (i.e. key input B) to the HES (SEP 290) of the protected key manager. In the remote key manager, a key generator 320' accesses key input data structure 312' and supplies the key input (i.e. key input A) to the HES (e.g. SEP 290') of the remote key manager. In this way, SEP 290 may generate link key A and SEP 290' may generate link key B, wherein link key A and link key B both have the same encoding so link key B may be used by the remote key manager to decrypt data encrypted with link key A and vice versa. As a result, data is securely transmitted between key managers without resorting to the use of a software key.

Key generator 320 is further operative to generate a key for securing data of a connected storage server. For example, the protected key manager receives requests from a remote system, such as a storage server 110A (FIG. 1) embodied as a database server, to secure data stored in a new portion of secure storage. The request may include a secure storage ID for which a new key will be generated. Key generator 320 of the protected key manager is then operative to request the generation of a new key from SEP 290 of the protected key manager and store the new key in a key data structure 326 on disks 228. Key data structure 326 also includes the secure storage ID associated with the new key.

In the exemplary embodiment, key generator 320 is also operative to generate a key in the key manager for the dedicated purpose of securing data stored by the particular key manager. For example, keys intended for or retrieved from disks 228 of a key manager may also be secured using a hardware key, referred to as a "device key", for the dedicated purpose of securing data of the key manager. In contrast to the link key, the device key is not replicated in both key managers. Instead, the protected key manager generates and uses its own device key (device key A) for the purpose of securing data of the protected key manager, whereas the remote key manager generates and uses its own device key (device key B) for the purpose of securing data of the remote key manager.

Wrapping engine 330 is operative to perform the necessary cryptographic operations for securing data of a key manager. When keys are migrated across or received over the trustee link, wrapping engine 330 is operative to use the link key of the key manager to encrypt data to be transferred to and decrypt data received from the other key manager. Alternatively, when storing data to or retrieving data from secure storage of the key manager, wrapping engine 330 is operative to use the device key of the key manager to perform the appropriate cryptographic operations. When a key manager receives a request to encrypt or decrypt data for a particular portion of secure storage, wrapping engine 330 is operative to retrieve the key associated with the particular portion of secure storage from key data structure 326, and perform the appropriate cryptographic operation on data supplied by the database server using encryption engine 350, for example.

Operations for delivering data across a trustee link are performed by migrate engine 340. In one embodiment, instructions stored in memory 210 are executed by a general-purpose processor (e.g. CPU 202) for carrying out the functions of migrate engine 340 via network adapter 220 (FIG. 2). Migrate engine 340 is operative with wrapping engine 330 for preparing for data migration across the trustee link or to process data received across the trustee link.

In the protected key manager, migrate engine 340 is operative to determine the keys newly generated by encryption engine 316 or newly received from the database server. In one embodiment, the keys may be stored in a key sync data structure 342 resident in memory 210 as a sequential list of keys managed by the protected key manager. A sync indicator in the key sync data structure 342 identifies a point in time of the sequential list for which keys have already been migrated to the remote key manager. Illustratively, the remote key manager periodically or intermittently requests new keys of the protected key manager across the trustee link. In response, migrate engine 340 of the protected key manager determines the keys which have not been migrated to the remote key manager using the key sync data structure 342. Upon determining which keys need to be migrated, the protected key manager retrieves the appropriate keys from disks 228, wrapper engine 330 unwraps the new keys using device key A and re-wraps the new keys using link key A, and migrate engine 340 sends the wrapped data across the trustee link to the remote key manager.

In the remote key manager, a migrate engine 340' is operative to issue such requests for new keys across the trustee link. In response, migrate engine 340' receives new keys from the protected key manager and processes the received keys. More particularly, migrate engine 340' unwraps the received keys using its locally available link key (link key B), wraps the new keys using device key B, and stores the keys in key data structure 236 intended for disks 228' of the remote key manager.

Illustratively, each of the data structures 312, 326, 342 is stored in memory 210 of FIG. 2 and accessed by components of the CMS. In certain embodiments, information stored in data structures 312, 326, 342 may be stored in a single data object for centralized storage of such information. Further, each of the data structures 312, 326, 342 may be stored in the same or a different location in memory or on disk as another data structure, so it will be appreciated that the invention is not so limited by the exemplary embodiment described herein.

Cryptographic engine 350 operative in the protected key manager receives a request from a connected storage system to perform a cryptographic operation on client data. Under normal operating conditions, cryptographic engine 350 receives the request from a protected database server which includes a secure storage ID as well as the actual data to be decrypted. Cryptographic engine 350 thereafter retrieves the appropriate key associated with the secure storage ID and supplies both the actual data and the retrieved key to SEP 290.

SEP 290 then decrypts the data and returns the decrypted data to cryptographic engine 350, whereby cryptographic engine 350 returns the processed (e.g. encrypted or decrypted) data to the protected database server.

In a disaster, a client request is serviced by a remote database server (e.g. storage server 110B) coupled to the remote key manager. The remote database server may provide both the secure storage ID and client data to the remote key manager, where a cryptographic engine 350' is operative to retrieve the appropriate key (automatically migrated from the protected key manager), perform the requested cryptographic operation, and return processed data to the remote database server for ensuring the security and accessibility of data in secure storage.

Security Manager

Figure 4:
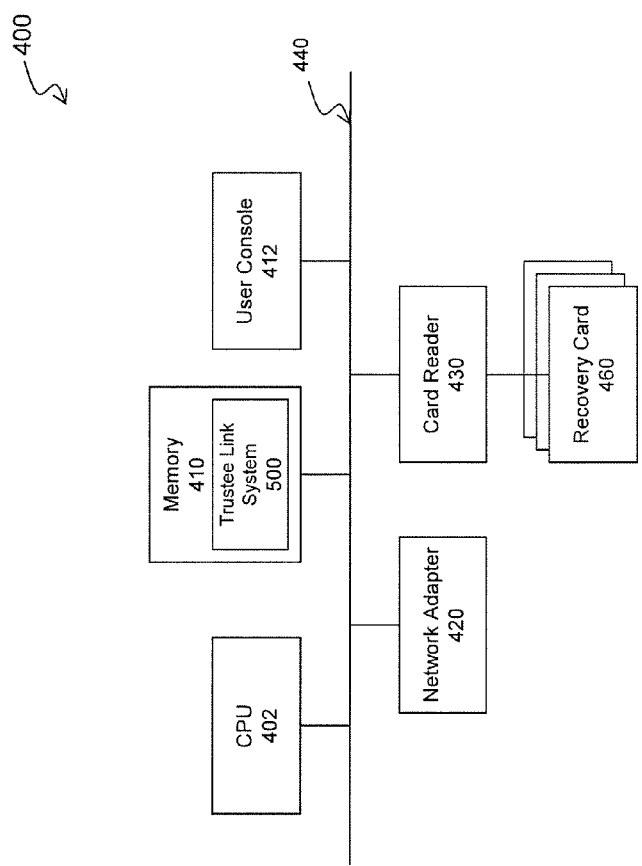
FIG. 4 is a schematic block diagram of a security manager that may be advantageously used to establish an authenticated communication channel between key managers in one embodiment.

FIG. 4 is a schematic block diagram of the security manager 400 that may be advantageously used to authenticate the communication channel between the protected and remote key managers in one embodiment. As shown in FIG. 1, the security manager may be coupled to each of the key managers for exchanging data with each of the key managers. Illustratively, the security manager comprises one or more processors, e.g., central processing units (CPU 402), a memory 410, one or more network adapters 420, one or more recovery cards 460, and a card reader 430 interconnected by a system bus 440, such as a conventional Peripheral Component Interconnect (PCI) bus.

The security manager connects to each of the key managers via network adapter 420 for establishing a trustee link between the key managers. Network adapter 420 may connect to the key managers over point-to-point links, wide area networks, virtual private networks implemented over a public network (Internet) or shared local area networks.

Memory 410 illustratively comprises storage locations that are addressable by the processors and adapters for storing software processes and data structures associated with the present invention. Software processes include, for example, executable computer program code implementing protocols for communicating with key managers 200 and other systems (not shown). The processor and adapters may comprise processing elements and/or logic circuitry configured to execute the processes and manipulate the data structures. In alternate embodiments, the processes may be implemented in hardware, in firmware, by software-executing general purpose processors and/or a combination thereof. As such, the description of processes being implemented in executable software should be taken as exemplary only. It would be apparent to those skilled in the art that other processing and memory means, including various computer readable media, may be used for storing and executing program instructions pertaining to the invention described herein.

Memory 410 further implements a trustee link system 500 for authenticating the identities of key managers between which keys are to be migrated. The techniques of the trustee link system 500 are described further in reference to FIG. 5. In one implementation, trustee link system 500 is resident in memory 410 and executed by CPU 402 of the security manager. Trustee link system 500 further implements a protocol for securely communicating with each of the key mangers. In particular, such protocol may include a first exchange to communicate with the protected key manager and a a second exchange to communicate with the remote key manager.

Authentication protocols are operative to verify devices wishing to communicate securely and are well known in the art. Characteristics of known authentication protocols may include the exchange of information between devices, whereby a second device must respond with a desired response (e.g. hash algorithm value) in response to a message from a first device to validate the identity of the second device. Illustratively, trustee link system 500 implements the Trust Establishment Packet/Trust Authorization Packet (TEP/TAP) exchange protocol developed by NetApp, Inc. of Sunnyvale, Calif., wherein the TEP portion of the exchange is performed between the protected key manager and the security manager and the TAP portion of the exchange is performed between the remote key manager and the security manager.

In the exemplary embodiment, trustee link system 500 requires manual authentication by a user (e.g. security administrator) interfacing with the security manager for successfully completing the message exchanges of TEP and TAP. Such manual authentication includes the user physically inserting one or more recovery cards 460 into card reader 430. In the exemplary embodiment, recovery cards 260 each include a processor and a non-volatile memory (not shown in this figure) that when provided a correct password (e.g. supplied by the administrator interfacing with the security manager via card reader 430) authenticates the user to the protected or remote key manager and authorizes acceptance of a TEP or TAP.

Stored in non-volatile memory of recovery cards 260 is at least one user password which when such password matches the one supplied by the administrator indicates that the administrator is an authorized system user. CPU 402 may execute instructions of trustee link system 500 to receive confirmation from recovery cards 260 that the password(s) match and authenticates the user to the protected or remote key manager allowing acceptance of a TEP or TAP by the respective key manager for establishing the trustee link. In other embodiments, functionality of recovery card 460 and card reader 430 may be implemented in a single device such as a Universal Serial Bus (USB) device operative to perform such functions.

When the proper password has been provided by the user to recovery cards 260, trustee link system 500 establishes communication with the respective key manager in accordance with the TEP/TAP exchange protocol. When communication has been successfully established with each of the key managers, the remote key manager may directly send requests for new keys to the protected key manager across network 140 (FIG. 1), for example. Further, the protected key manager may respond to these requests, for instance, by sending data encrypted with link key A across network 140 to the remote key manager to be decrypted with link key B.

Trustee Link System

Figure 5:
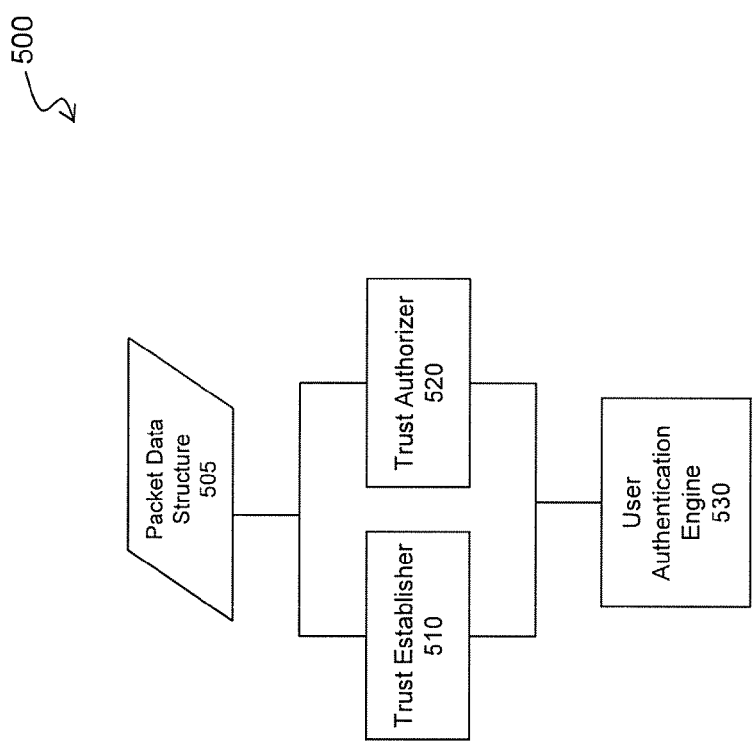
FIG. 5 is a schematic block diagram of a trustee link system implemented by the security manager of FIG. 4 that may be advantageously used with the present invention.

FIG. 5 is a schematic block diagram of a trustee link system (TLS) 500 implemented by security manager 400, that may be advantageously used with the present invention. Illustratively, the TLS includes a trust establisher 510, a trust authorizer 520, and a user authentication engine 530, each resident as instructions stored in memory 410 and executed by CPU 402 of the security manager. It will be appreciated that aspects of TLS 500 may be optionally implemented in firmware or hardware, or any combination thereof. Further, aspects of TLS 300 may be executed in the same or different processing environment so it will be appreciated that the invention is not so limited to the embodiments discussed herein.

Trust establisher 510 includes operations for receiving a request from a protected key manager to establish communication with a remote key manager. In one embodiment, trust establisher 510 performs the trust establishment packet (TEP) portion of the exchange for carrying out this function. Trust establisher 510 is thus operative to receive and respond to the various communication exchanges required by TEP. In one embodiment, if user authentication engine 530 (described further below) fails to authenticate the administrator, trust establish 510 may refuse to respond to a message thus preventing completion of the TEP portion of the exchange.

Included in a request from the protected key manager may be key input information (e.g. stored in key input data structure 312) for generating link key B at the remote key manager, as well as identifying information of both the protected and remote key managers. For example, key input may include a public key (e.g. half of a conventional public key/private key exchange) of the protected key manager and the name of a hashing algorithm in accordance with techniques known in the art for generating shared encryption keys. Identifying information may include the key manager name, Internet Protocol (IP) address, etc. When received, trust establisher 510 may store the information in packet data structure 505, for example. Illustratively, packet data structure 505 is resident in memory 410 of security manager 400.

To establish communication with the remote key manager, trust authorizer 520 is operative to send a request to the remote key manager using the TAP portion of the exchange. For example, in submitting the request, trust authorizer 520 may provide packet data structure 505 (or the contents thereof) in the request to the remote key manager. The remote key manager may then use the key inputs to generate a link key for storage (e.g. in memory 291') and use (e.g. by SEP 290') locally by the remote key manager.

Trust authorizer 520 also functions to provide key input information (e.g. stored in key input data structure 312' at the remote key manager) for generating link key A at the protected key manager. This key input may include the public key (e.g. half of a conventional public key/private key exchange) of the remote key manager and the name of a hashing algorithm in accordance with techniques known in the art for generating shared encryption keys. Upon receipt, the protected key manager may generate link key A whereby data encrypted with link key A may be decrypted with link key B by virtue of the public key exchange. Upon generation of link keys at both key managers, the TEP and TAP portions of the exchange are considered successfully completed at which time the remote key manager may submit key requests directly to the protected key manager.

The functionality of user authentication engine 530 includes authenticating a security administrator of security manager 400. For instance, user authentication engine 530 confirms (i.e. verifies) a match between an administrator-supplied password and the password stored on recovery cards 460 of FIG. 4 to confirm the identity of the administrator. In one embodiment, user authentication engine 530 requests trust authorizer 520 to initiate communication with the remote key manager upon confirmation. Alternatively, if the administrator cannot be verified, trust authorizer 520 sends no request to the remote key manager.

When the message exchanges of the requisite protocol are successfully completed, the communication channel between the two key managers is authenticated as a trustee link. Thereafter, data may directly be transferred from one key manger across the trustee link via network 140, for example, to another key manager in a secure manner.

Linking Process

Figure 6:
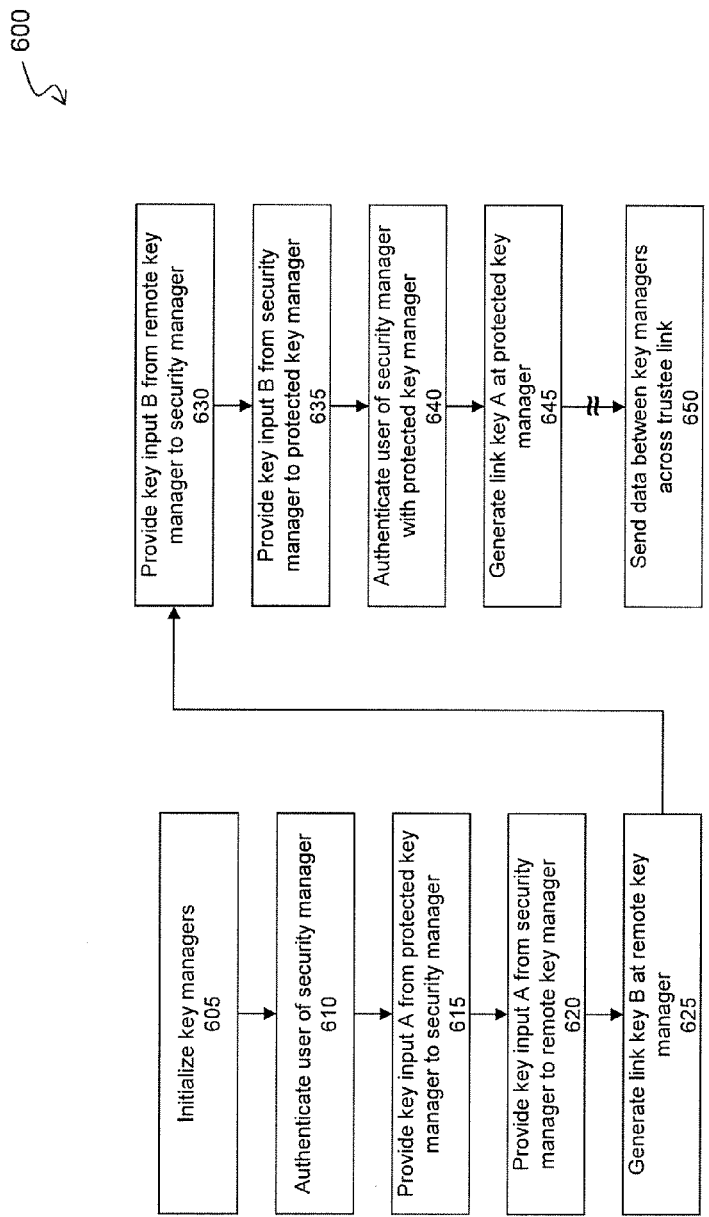
FIG. 6 shows an exemplary process by which the security manager of FIG. 4 establishes the authenticated communication channel between the key managers.

FIG. 6 shows an exemplary process 600 by which security manager 400 establishes the trustee link between the protected and remote key managers. Illustratively, linking engine 310 of each of the key managers are operative to participate in this process. At block 610, a security administrator initializes the key manager by interfacing with the each of the key managers (e.g. via respective user console 212 from FIG. 2).

Initialization includes the preliminary start-up procedures performed by the administrator when a new key manager is first powered on.

When initializing a protected key manager, the administrator may provide identifying information (e.g. name, address, etc.) of a remote key manager between which a trustee link is to be established. Similarly, when initializing the remote key manager, the administrator may provide identifying information of the protected key. During initialization, each of the key managers also automatically generates a device key (e.g. using respective SEP 290 from FIG. 2) for secure storage of keys to be managed by each key manager.

User authentication engine 530, for example, is operative to verify the identity of the administrator at block 610 as an authorized user of the security manager. Upon verification of the administrator, trust authorizer 520 may request a secure communication channel with the remote key manager. At block 615, the protected key manager retrieves key input data structure 312 (key input A) and includes it in a request to the security manager to establish a trustee link with the remote key manager. For instance, trust establisher 510 from FIG. 5 is operative to receive the request and store the contents in packet data structure 505. Further, trust authorizer 520 is operative to initiate communication between the security manager and the remote key manager by providing the remote key manager the contents of packet data structure 505 (block 620).

At block 625, a key generator of the remote key manager is operative to generate link key B using the supplied key input A. Upon the generation of link key B, the remote key manager retrieves its key input data structure 312' (key input B) and includes it in a request to the security manager to complete establishing the trustee link with the protected key manager (block 630). For instance, trust authorized 520 from FIG. 5 is operative to store the contents in a second packet data structure 505' and provide such contents to the security manager. Trust establisher 510 of the security manager may then forward key input B of packet data structure 505' to the protected key manager (block 635).

Prior to processing the supplied key input B, the security manager receives confirmation from recovery cards 260 that the password(s) match and authenticates the user. This authentication can be performed by linking engine 310 exchanging information between the respective key manager and the security manager using public key certificates, for instance, well known in the art. When authenticated, link key A is generated at the protected key manager by key generator 320, for example, to have the same encoding as link key B.

Upon the successful completion of the key input exchanges between the key managers and the resultant generation of link keys at each key manager, the remote key manager may thereafter send key requests directly to the protected key manager across network 140 in a secure manner without going through the security manager (block 650). Upon receipt of a request from the remote key manager, the protected key manager responds to such requests by sending the requested data directly to the remote key manager.

Using these techniques, the identity of each key manager is verified and constitutes an exemplary authentication process performed by the security manager. As such, keys may be securely migrated from the protected key manager to an intended remote key manager to diminish the risk of unauthorized access.

Securely Migrating Keys (Protected Key Manager)

Figure 7:
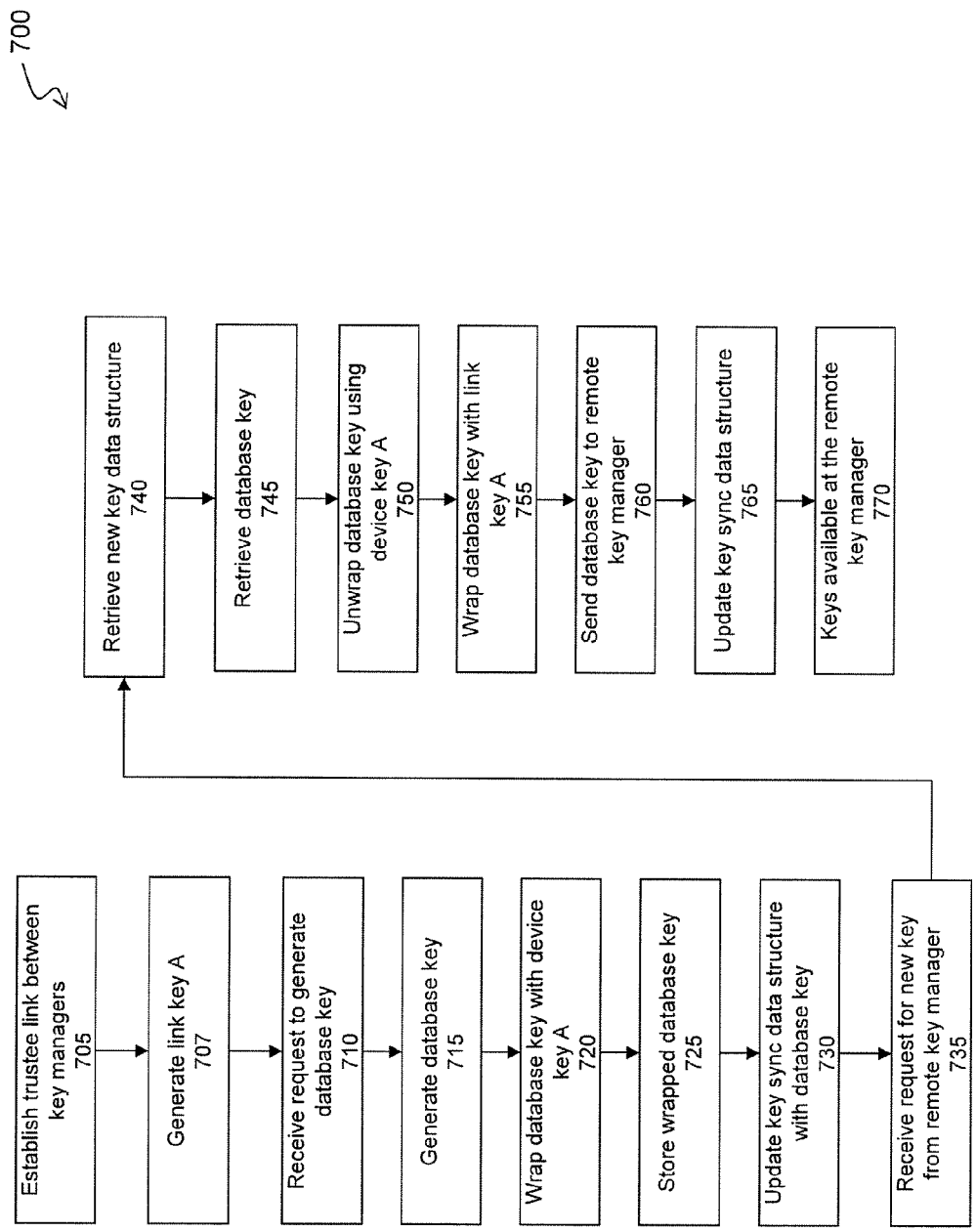
FIG. 7 is an exemplary process for a protected key manager to securely migrate a new key to a remote key manager according to one embodiment of the present invention.

FIG. 7 is an exemplary process 700 for the protected key manager to automatically migrate a new key to the remote key manager according to one embodiment of the present invention to ensure the availability of encrypted data. Illustratively, the steps of process 700 are performed by aspects of the cryptographic management system of the protected key manager.

At block 705, the protected key manager establishes a trustee link with a remote key manager. For example, process 600 may be performed between the security manager 400 and the key managers 200 (FIG. 1) to establish the trustee link across network 140 between the key managers 200. In particular, linking engine 310 of the protected key manager is operative to initiate process 600 with the security manager, and linking engine 310' of the remote key manager is operative to enable the trustee link with the remote key manager. A result of the establishment of the trustee link is the generation of link key A (block 707) at the protected key manager having the same encoding as link key B at the remote key manager.

At block 710, a database server servicing data storage requests from clients 102 (FIG. 1) for example, sends a request to the protected key manager to generate a database key for securing data of the database server (e.g. storage server 100A of FIG. 1). The request also includes a secure storage ID (e.g. database ID) which uniquely identifies the database server. In response, key generator 320 in the protected key manager requests the generation of a new key by SEP 290, for example (block 715). Thereafter, the database server may send encryption and decryption requests to the protected key manager, and the protected key manager may perform the requested operation using the database key.

Continuing with process 700, protected key manager wraps the database key using device key A at block 720. Wrapping engine 330 may be operative to encrypt the database key using SEP 290. Upon receipt, the encrypted database key may be stored in key data structure 326 for storage on disk 228, for example. Key data structure 326 may further associate the database ID with the encrypted key for identifying the key used by the database server.

Periodically, the protected key manager may receive requests for new keys from the remote key manager across the trustee link. New keys include keys generated by the protected key manager since a time the remote key manager last requested new keys. Alternatively, new keys include keys received by the protected key manager from any remote system such as the database server.

In the exemplary embodiment, the remote key manager sends new key requests to the protected key manager every 5 seconds, for example. To easily identify new keys to be migrated, the CMS implements key sync data structure 342, for instance, which includes a sequential list of the keys generated at the protected key manager. An attribute (e.g. sync indicator) may be associated with the last key migrated from the protected key manager to the remote key manager to indicate which keys are already available at the remote key manager. When responding to a request from the remote key manager, migrate engine 340 may easily identify the keys to migrate using key sync data structure 342, retrieve such keys from storage (e.g. disks 228), and securely provide such keys to the remote key manager across the trustee link. If no new keys have been generated or received since the last request from the remote key manager, the sync indicator will be associated with the last key in the sequential list of key sync data structure 342, thereby indicating no new keys since the last request.

Upon the generation of a new database key, the CMS updates key sync data structure 342 by appending an indicator for the new database key (e.g. key ID) to the end of the list in such data structure (block 730). At block 735, a request for new keys is received by the protected key manager from the remote key manager across the trustee link. To check the availability of new keys in the protected key manager, migrate engine 340 retrieves key sync data structure 342 (block 740) which may indicate that the sync indicator is not at the end of the list (i.e. there exists at least one new key to be migrated). To that end, migrate engine 340 retrieves the newly generated database key from disks 228 and requests the wrapping engine 330 to decrypt the database key using device key A (block 750). Migrate engine 340 further requests wrapping engine 330 to encrypt the database key using link key A (block 755).

At block 760, the database key (wrapped with link key A) is sent by the migrate engine 340 to the remote key manager. The associated database ID is also provided along with the wrapped key across the trustee link to the remote key manager. To indicate the migration of the database key, migrate engine 340 updates the key sync data structure 342 by associating the sync indicator with the database key in key sync data structure 342 (block 765). At block 770, the database key is available at the remote key manager for performing cryptographic operations thereat to ensure accessibility of data encrypted with the database key upon a failure of the protected key manager.

Securely Mirroring Keys (Remote Key Manager)

Figure 8:
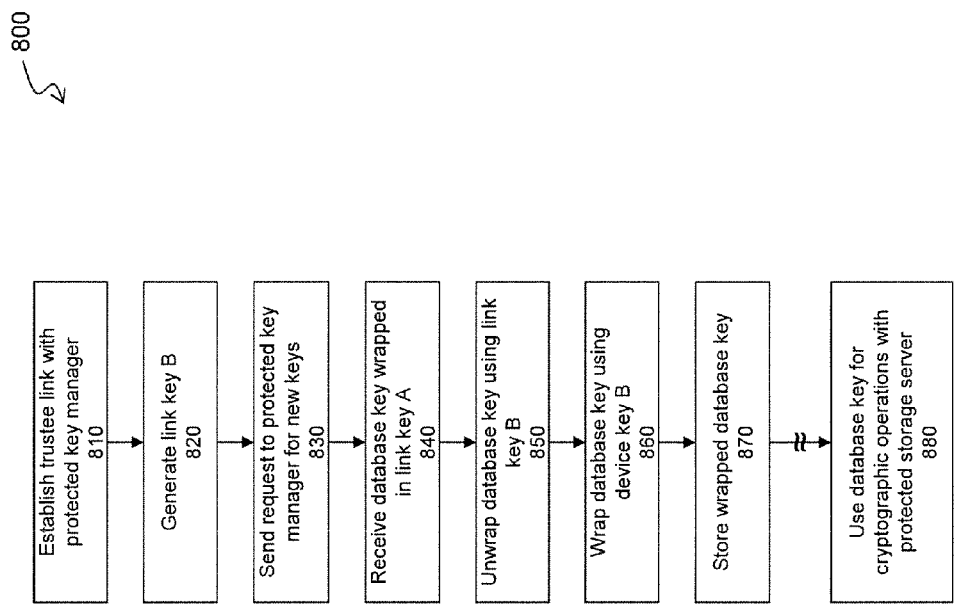
FIG. 8 is an exemplary process for the remote key manager to securely store keys migrated from the protected key manager in the exemplary embodiment.

FIG. 8 is an exemplary process 800 for the remote key manager to securely store keys migrated from the protected key manager in the exemplary embodiment. Aspects of process 800 are advantageously performed by the cryptographic management system of the remote key manager.

At block 810, the remote key manager establishes a trustee link with the protected key manger. For example, process 600 may be performed between the security manager 400 and the key managers 200 (FIG. 1) to establish the trustee link across network 140 between the key managers 200. To that end, linking engine 310' of the remote key manager is operative to facilitate the TEP portion of the exchange with the security manager 400 to enable the trustee link with the protected key manager.

At block 820, key generator 320' generates the link key B to have the same encoding as link key A of the protected key manager. Here, key generator 320' provides the key inputs provided by the security manager of packet data structure 505 (FIG. 5) to the SEP 290' (FIG. 2). SEP 290' in response generates link key B and stores the key locally for use in performing cryptographic operations on data received from the protected key manager.

At block 830, migrate engine 340' of the remote key manager sends a request to the protected key manager for any new keys generated or received by the protected key manager across the trustee link. In the exemplary embodiment, the remote key manager sends new key requests to the protected key manager every 5 seconds, for example. If new keys are to be migrated to the remote key manager (e.g. via the sequential key list in key sync data structure 342 of the protected key manager), then migrate engine 340' receives keys from the protected key manager wrapped with link key A (block 840).

In order to access the wrapped key, wrapping engine 330' provides the wrapped key to SEP 290' for decrypting the key, for example. Advantageously, SEP 290' uses the locally stored link key B to decrypt the migrated key (block 850). To securely store the migrated key in disks 228' of the remote key manager, wrapping engine 330' further wraps the migrated key with device key B (via SEP 290' from FIG. 2) at block 860. Continuing to block 870, migrate engine 340' stores the migrated key wrapped with device key B in a key data structure 326', for example.

Upon a failure, the remote key manager may then service requests for cryptographic operations of client data (block 880). For example, cryptographic engine 350' operative at the remote key manager receives a cryptographic request from a database server (e.g. storage server 110B) and performs the requested operation using a migrated key to ensure the accessibility of the encrypted data. The process by which the remote key manager is operative in a failover event to ensure the availability of the database key is described further in reference to FIG. 9.

Using the steps in processes 700, 800, novel cryptographic management systems facilitate the performance of cryptographic operations at the remote key managers using an automatically migrated database key upon a failure of the protected key managers. Since keys are handled exclusively by the key managers, unauthorized access to the database key at other devices (e.g. separate security devices in conventional configurations) may be thwarted. Further, since new keys are automatically migrated across an authenticated communication channel by the remote key manager, manual efforts of the security administrator to migrate keys associated with conventional techniques are dramatically reduced while maintaining the strength of the key.

Ensuring Key Availability During a Failover

Figure 9:
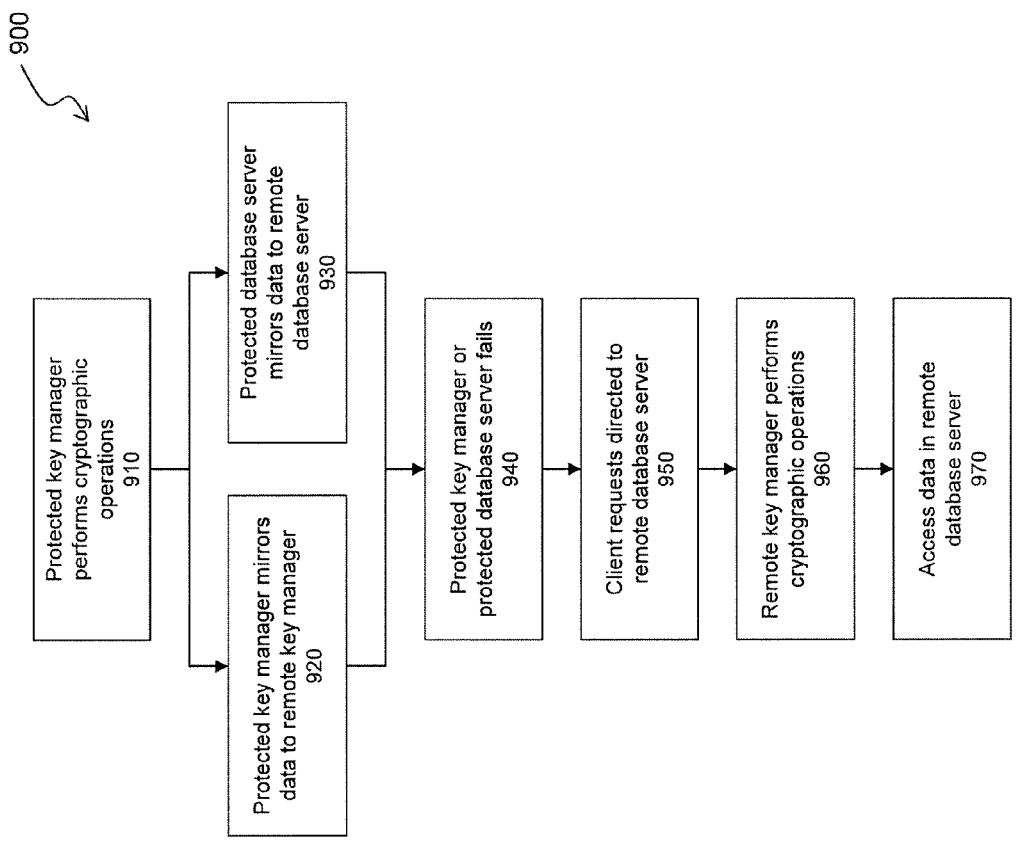
FIG. 9 illustrates an exemplary process for the remote key manager performing cryptographic operations using a key automatically migrated from the protected key manager.

FIG. 9 illustrates an exemplary process 900 for a remote key manager performing cryptographic operations on data using a key securely migrated from the protected key manager. Process 900 may be operative in the environment 100 of FIG. 1, including a protected key manager (e.g. key manager 200A) and a remote key manager (e.g. key manager 200B). Further, the protected key manager performs cryptographic operations on a primary storage server (e.g. storage server 110A) embodied as protected database server, and the remote key manager performs cryptographic operations on a secondary storage server (e.g. storage server 110B) embodied as a remote database server. Under normal operation, only the protected database server services storage requests from a client (e.g. client 102 from FIG. 1). Upon a failover event, such as the failure of the protected key manager or the protected database server, the remote database server is then operative to service storage requests from a client (e.g. client 102 from FIG. 1).

At block 910, the protected key manager manages a key (e.g. database key) for encrypting and decrypting data stored at the protected database server. In one embodiment, the protected database server requests of the protected key manager the generation of a new database key and the performance of a cryptographic operation using the new database key according to process 700. In other embodiments, the protected key manager receives the database key to be managed from an administrator (e.g. via console 212) or from the protected database server directly, for example.

In the exemplary embodiment, the protected key manager performs cryptographic operations on data of the protected database server using the database key generated by the protected key manager. When a client requests data from secure storage, the protected database server retrieves the requested data, requests the protected key manager to decrypt the retrieved data, and provides the unencrypted data to the client. Similarly, when a client requests data to be stored in secure storage, the protected database server requests the protected key manager to encrypt the received data and stores the encrypted data in secure storage of the protected database server.

The database key may then be securely migrated from the protected key manager to the remote key manager at block 920. Illustratively, process 700 is operative to ensure the database key is sent across an authenticated channel (e.g. trustee link across network 140) in encrypted form to the remote key manager.

At 930, the protected database server mirrors client data (e.g. stored in disks 115A) to the remote database server (e.g. to be stored in disks 115B). It will be appreciated that any conventional techniques for mirroring data between database servers may be utilized for copying data from one location to another, such as protocols known in the art. Further, the operations related to mirroring data between database servers may be performed independently of the operations for mirroring keys between key managers. Thus, aspects of the novel technique are not so limited.

In a disaster, one of or both the protected key manager and the protected database server will fail (block 940). As such, data stored in secure storage (e.g. disks 115) of the protected database server is inaccessible. At block 950, client requests are directed to the remote database server for continued access to client data in secure storage (e.g. stored on disks 115B in encrypted form). In one embodiment, a user (storage administrator) may interface with the remote database server to takeover the services of the protected database server. In other embodiments, requests may be automatically forwarded to the remote database server for servicing the client requests.

At block 960, the remote database server sends a request to the remote key manager for performing a cryptographic operation on the data in secure storage of the remote key manager (e.g. disks 115B). Included in the request is also a database ID which is common to the protected and remote database servers since each stores a copy of the same data. The remote key manager then retrieves the database key using the database ID, and performs the requested operation for the remote key manager. The remote database server may then respond to the client request (block 970) despite the failure of the protected key manager or protected database server. Continued access to data in secure storage is thereby provided by ensuring the availability of keys and continued performance of cryptographic operations by the remote key manager.

Load Balancing

Figure 10:
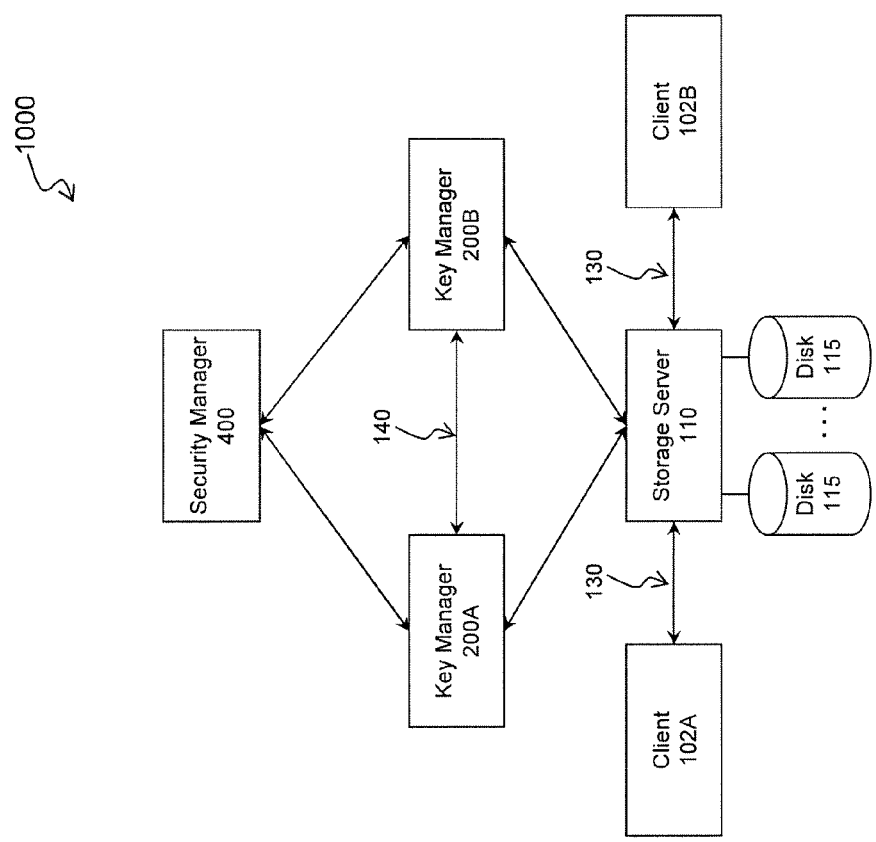
FIG. 10 is a schematic block diagram of an environment 1000 for multiple key managers servicing cryptographic requests under normal operating conditions according to one embodiment.

In one embodiment, the protected key manager and the remote key manager are both operative to service cryptographic requests under normal operating conditions. FIG. 10 is a schematic block diagram of an environment 1000 including a first key manager (e.g. key manager 200A) and a second key manager (e.g. key manager 200B) coupled to a storage server 110 that may be used with the present invention. Advantageously, environment 1000 implements the novel techniques (e.g. process 700, 800) for securely migrating keys from the first key manager to the second key manager to ensure that keys are made available to both the first and the second key manager.

In operation, multiple clients 102 send requests to storage server 110 for storing data to or retrieving data from disks 115. Illustratively, disks 115 are logically partitioned into logical portions of secure storage for storing data of client 102A in one portion and storing data of client 102B in a different portion, for example. Storage server 110 therefore services data storage requests from multiple clients 102, in which each request may involve the retrieval of numerous keys for performing the requested cryptographic operations. Accordingly, storage server 110 is coupled to both key managers 200 to benefit from the resources of multiple key managers.

Illustratively, storage server 110 issues a first request to key manager 200A to encrypt or decrypt data. Further, the request may include data to be encrypted or decrypted for several portions of secure storage on disks 115. Upon receipt, key manager 200A must then retrieve the appropriate key for each portion before data may be encrypted or decrypted. While key manager 200A is busy servicing the first cryptographic request, key manager 200B may stand idle awaiting a cryptographic request from storage server 110. Accordingly, storage server 110 may issue its next request to the second key manager for performing other cryptographic requests in parallel to the cryptographic tasks of the first key manager.

In one embodiment, storage server 110 may distribute requests among multiple key managers 200 in a round-robin fashion to reduce the delay in servicing the underlying request from clients 102. It will be appreciated that other conventional techniques known in the art may be implemented by storage server 110 for directing certain requests to key manager 200A and other requests to key manager 200B. Notwithstanding the particular load-balancing technique utilized by storage server 110, key managers 200 are configured using the novel techniques of the present invention to ensure the availability of keys in both key managers 200 and perform cryptographic operations on behalf of storage server 110.

Figure 11:
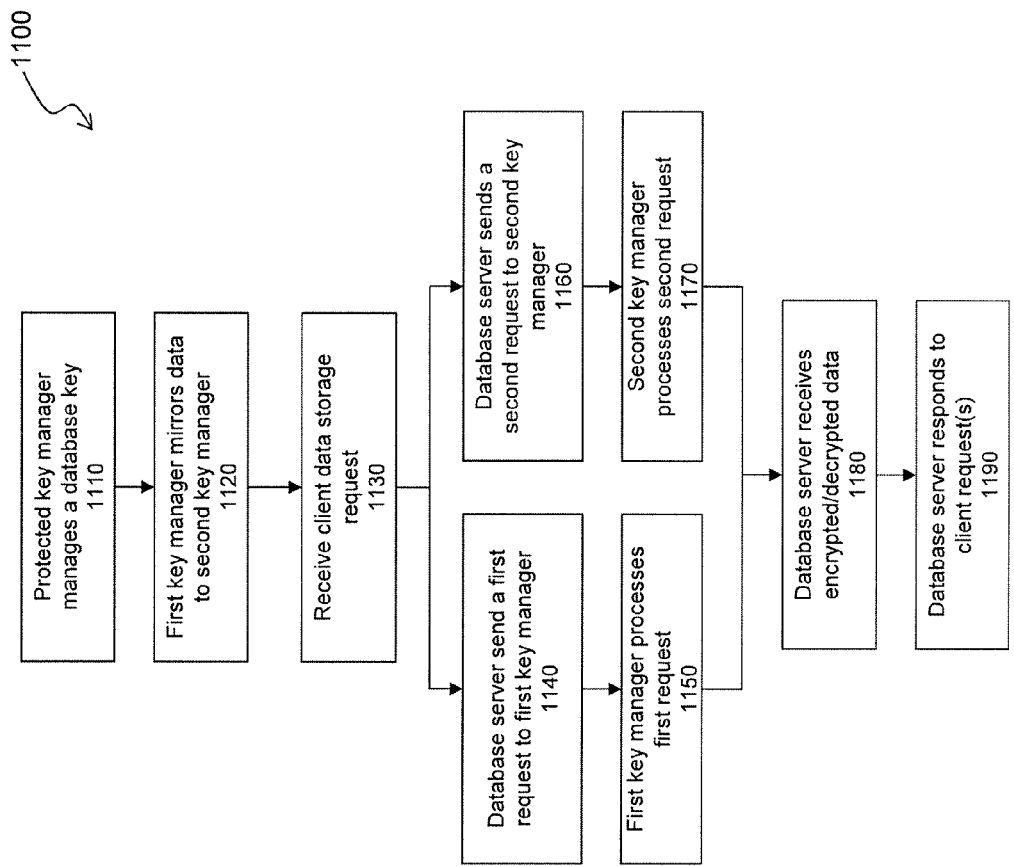
FIG. 11 is an exemplary process flow by which the environment of FIG. 10 may advantageously implement aspects of the present invention for a storage server distributing cryptographic requests between multiple key managers.

FIG. 11 is an exemplary process flow 1100 by which environment 1000 may advantageously implement aspects of the present invention for a storage server distributing cryptographic requests between multiple key managers. At block 1110, a first key manager (e.g. key manager 200A of FIG. 10) manages a key (e.g. database key) of a storage server (e.g. storage server 110 of FIG. 10) embodied as a database server. The database key may be generated by the first key manager (e.g. via process 700) or may be provided the database key to be managed. At block 1120, the first key manager mirrors the database key to the second key manager to ensure the key is locally available to the remote key manager. Advantageously, process 700 may be implemented in environment 1000 to securely mirror keys between the key managers.

At block 1130, the database server receives a storage request from a client (e.g. client 102 from FIG. 10). The database server then issues a cryptographic request to the first key manager (block 1140). The first key manager in response retrieves the database key and performs the requested operation (block 1150). Illustratively, the database server implements a round-robin technique for issuing cryptographic requests. Accordingly, the database server issues its next request (the second request) to the second key manager (block 1160). The second key manager in response retrieves the locally stored database key and performs the request operation (block 1170).

Encrypted or decrypted data is thereafter returned by the key managers to the database server at block 1180 in response to the first and second request. At block 1190, the database server responds to client requests by storing encrypted data to secure storage (e.g. disks 115 from FIG. 10) or by returning unencrypted data to the client.

Using the novel techniques described herein, encryption keys may be securely migrated from a protected key manager to a remote key manager to ensure the availability of such keys even in a disaster. Manual efforts required by the security administrator with the conventional techniques are minimized since the remote key manager automatically requests new keys of the protected key manager. Further, the keys are securely managed exclusively by key managers, thus preventing exposure of such keys to unauthorized programs resident in other processing environments. As a result, the secure management of encryption keys by a remote key manager in turn ensures that clients have continued access to data in secure storage notwithstanding a failure of the protected key manager.

It will be appreciated that the variations and examples discussed herein are not intended to be exhaustive or to limit the invention. These variations and examples intend to provide further understanding of embodiments of the present invention.

Although the present invention for purpose of explanation has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Unless specifically stated otherwise, it is to be appreciated that throughout the discussions utilizing terms such as "processing" or "computing" or "calculating" or "determining" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A computer-implemented method comprising:
   authenticating, by a first key manager, a communication channel between the first key manager and a second key manager;
   managing and storing, by the first key manager, a key for performing cryptographic operations on data of a storage system;
   receiving, by the first key manager, a request for the key from the second key manager across the authenticated communication channel;
   responsive to the request, securely providing, by the first key manager, the key to the second key manager across the authenticated communication channel;
   wherein the step of securely providing the key to the second key manager includes:
      identifying, by the first key manager, the key;
      encrypting, by the first key manager, the key with a first key to produce an encrypted key; and
      sending, by the first key manager, the encrypted key to the second key manager across the authenticated communication channel;
   wherein the step of authenticating the communication channel comprises verifying identities of the first key manager and the second key manager prior to sending the encrypted key directly between the first key manager and the second key manager;
   wherein the second key manager decrypts the encrypted key and uses the decrypted key to perform cryptographic operations on the data responsive to a cryptographic request of the storage system upon a failure of the first key manager to perform said cryptographic operations.

2. A computer-implemented method of claim 1, wherein a security manager performs the authenticating, the step of authenticating comprising:
   performing a first protocol verifying the identity of the first key manager;
   performing a second protocol verifying the identity of the second key manager; and
   upon a successful completion of the first and the second protocols, the first key manager directly sending the encrypted key to the second key manager.

3. A computer-implemented method of claim 1, wherein the authenticated communication channel comprises a trustee link.

4. A computer-implemented method of claim 1, wherein the first key manager services cryptographic requests for a first storage server of the storage system, the second key manager services cryptographic requests for a second storage server of the storage system, and the second storage server mirrors data of the first storage server.

5. A computer-implemented method of claim 1, wherein the step of managing further comprises generating the key upon request by the storage system.

6. A computer-implemented method of claim 1, wherein the step of managing the key comprises receiving the key from the storage system.

7. A computer-implemented method of claim 1, wherein the identifying includes accessing a key sync data structure identifying the key.

8. A computer-implemented method of claim 1, wherein the first key is a link key.

9. A computer-implemented method of claim 1, further comprising the first key manager securing the key in a first secure storage of the first key manager using a first device key and the second key manager storing a copy of the key in a second secure storage of the second key manager using a second device key.

10. A computer-implemented method comprising:
    authenticating, by a remote key manager, a communication channel between the remote key manager and a protected key manager;
    requesting, by the remote key manager from the protected key manager, a key for performing cryptographic operations on data responsive to a first cryptographic request of a storage system, the key being available at the protected key manager but not at the remote key manager;
    securely receiving the key at the remote key manager from the protected key manager across the authenticated communication channel in response to the requesting, the key encrypted by the protected key manager using a first link key;

accessing, by the remote key manager, the received key using a second link key, the second link key comprising a replication of the first link key; and wherein the step of authenticating the communication channel comprises verifying identities of the protected key manager and the remote key manager prior to sending data directly between the protected key manager and remote key manager;

performing, by the remote key manager using the accessed key, cryptographic operations on the data responsive to a second cryptographic request of the storage system in disaster recovery of the protected key.

11. A computer-implemented method of claim 10, wherein a security manager performs the authenticating, the step of authenticating comprising:

performing a first protocol verifying the identity of the protected key manager;

performing a second protocol verifying the identity of the remote key manager; and upon successful completion of the first and the second protocol, the protected key manager sending the key directly to the remote key manager.

12. A computer-implemented method of claim 10, wherein the requesting comprises the remote key manager periodically sending a request to the protected key manager for new keys.

13. A computer-implemented method of claim 12, wherein the new keys comprise keys generated by the protected key manager since the last request by the remote key manager.

14. A computer-implemented method of claim 12, wherein the new keys comprise keys received by the protected key manager since the last request by the remote key manager.

15. A computer-implemented method of claim 10, wherein the first link key is replicated by the remote key manager as a result of authenticating the communication channel.

16. A computer-implemented method comprising:

managing and storing, by a first key manager, an encryption key for securing data responsive to a cryptographic request of a storage system;

securely providing, by the first key manager, the encryption key to a second key manager across an authenticated secure communication channel in response to a request from the second key manager, the encryption key wrapped with a first link key; and wherein the step of securely providing the encryption key to the second key manager includes:

identifying, by the first key manager, the encryption key;

encrypting, by the first key manager, the encryption key with a first link key to produce an encrypted encryption key; and sending, by the first key manager, the encrypted encryption key to the second key manager across the authenticated communication channel;

wherein establishing the authenticated communication channel comprises verifying identities of the first key manager and the second key manager prior to sending data directly between the first key manager and the second key manager;

managing and storing, by the second key manager, the encryption key for ensuring accessibility to encrypted data of the storage system in response to a failure of the first key manager, the second key manager accessing the encryption key using a second link key having the same encoding as the first link key.

17. A computer-implemented method comprising:

generating, by a first key manager, an encryption key for securing data of a storage server;

securely providing, by the first key manager, the encryption key to a second key manager across an authenticated secure communication channel in response to a request from the second key manager, the encryption key wrapped with a first hardware key;

wherein the step of securely providing the encryption key to the second key manager includes:

identifying, by the first key manager, the encryption key;

encrypting, by the first key manager, the encryption key with the first hardware key to produce an encrypted encryption key; and sending, by the first key manager, the encrypted encryption key to the second key manager across the authenticated communication channel;

wherein establishing the authenticated communication channel comprises verifying identities of the first key manager and the second key manager prior to sending data directly between the first key manager and second key manager;

distributing, by the storage system, requests for cryptographic operations on the data between the first key manager and the second key manager for performing cryptographic operations on the data.

18. The computer-implemented method of claim 17, wherein the step of distributing is performed in a round-robin manner between the first key manager and the second key manager.

19. A system comprising:

a first key manager configured to perform primary cryptographic operations on data of a storage system;

a second key manager configured to perform secondary cryptographic operations on the data; and a security manager configured to authenticate a communication channel between the first key manager and the second key manager;

wherein the security manager is configured to verify identities of the first key manager and the second key manager prior to data being sent directly between the first key manager and the second key manager;

wherein the first key manager is configured to:

identify an encryption key;

encrypt the encryption key with a first hardware key; and send the encrypted encryption key to the second key manager across the authenticated communication channel in response to a request by the second key manager;

the second key manager configured to store the encryption key and perform the secondary cryptographic operations on the data using the encryption key when the first key manager fails to perform the primary cryptographic operations on the data.

20. A system comprising:

a linking engine configured to authenticate a communication channel between a first key manager and a second key manager for migrating data from the first key manager to the second key manager;

wherein the linking engine is configured to verify identities of the first key manager and the second key manager prior to data being sent directly between the first key manager and second key manager;

a key generator configured to generate a key for the first key manager for securing data of a storage system in response to a request from the storage system for the key;

a wrapping engine configured to wrap the key using a first link key of the first key manager and unwrap the key using a second link key of the second key manager;

a migration engine configured to send the key wrapped with the first link key across the authenticated communication channel from the first key manager to the second key manager in response to a request from the second key manager for the key; and a cryptographic engine for performing a cryptographic operation using the unwrapped key at the second key manager for ensuring accessibility to the data in the event the first key manager fails.

21. A system of claim 20, wherein the linking engine, the key generator, the wrapping engine, and the migration engine comprise a cryptographic management system.

22. A system of claim 20, wherein the linking engine, the key generator, the wrapping engine, and the migration engine are operative within the same processing environment.

23. A system of claim 20, wherein the linking engine, the key generator, the wrapping engine, and the migration engine are operative in at least two processing environments.

* * * * *